United States Patent
Enjoji et al.

(10) Patent No.: US 7,354,670 B2
(45) Date of Patent: Apr. 8, 2008

(54) FUEL CELL WITH FUEL GAS ADJUSTMENT MECHANISM

(75) Inventors: Naoyuki Enjoji, Wako (JP); Hideaki Kikuchi, Wako (JP); Yuichiro Kosaka, Wako (JP)

(73) Assignee: Honda Giken Kosyo Kabushiki Kaisha, Tokyo (JP)

( * ) Notice: Subject to any disclaimer, the term of this patent is extended or adjusted under 35 U.S.C. 154(b) by 241 days.

(21) Appl. No.: 10/608,452

(22) Filed: Jun. 26, 2003

(65) Prior Publication Data

US 2004/0091761 A1   May 13, 2004

(30) Foreign Application Priority Data

Jun. 26, 2002  (JP) .............................. 2002-186099

(51) Int. Cl.
 *H01M 8/10* (2006.01)
 *H01M 8/04* (2006.01)
 *H01M 8/24* (2006.01)

(52) U.S. Cl. ............................. 429/22; 429/24; 429/38; 429/13; 429/32; 429/34; 429/39

(58) Field of Classification Search .................. 429/22, 429/24, 38, 13, 32, 34, 39
See application file for complete search history.

(56) References Cited

U.S. PATENT DOCUMENTS

| | | | |
|---|---|---|---|
| 6,794,068 B2 * | 9/2004 | Rapaport et al. | 429/13 |
| 6,841,275 B2 * | 1/2005 | Pearson | 429/9 |
| 6,844,100 B2 * | 1/2005 | Bourgeois et al. | 429/38 |
| 2002/0164510 A1 | 11/2002 | Brueck et al. | |
| 2003/0186093 A1 * | 10/2003 | St-Pierre et al. | 429/13 |
| 2004/0142221 A1 * | 7/2004 | Kawamura et al. | 429/24 |
| 2004/0161649 A1 * | 8/2004 | Wariishi et al. | 429/32 |
| 2004/0166383 A1 * | 8/2004 | Schafer | 429/13 |

FOREIGN PATENT DOCUMENTS

| | | | |
|---|---|---|---|
| CA | 2379363 A1 | | 9/2002 |
| DE | 19930876 A1 | | 1/2001 |
| DE | 19962681 A1 | | 6/2001 |
| JP | 06-119931 | | 4/1994 |
| JP | 11-312531 | * | 11/1999 |
| JP | 2001-006698 A | | 1/2001 |
| JP | 2001-006708 A | | 1/2001 |
| JP | 2002-117880 | * | 4/2002 |

OTHER PUBLICATIONS

German Office Action for Application No. 10328583.0, dated Oct. 18, 2006.
Canadian Office Action, Dated Aug. 14, 2006.

\* cited by examiner

*Primary Examiner*—Patrick Joseph Ryan
*Assistant Examiner*—Angela J. Martin
(74) *Attorney, Agent, or Firm*—Lahive & Cockfield, LLP; Anthony A. Laurentano, Esq.

(57) ABSTRACT

A fuel cell includes cell assemblies connected to each other by a fuel gas connection passage, an oxygen-containing gas connection passage, and a coolant connection passage. A fuel gas adjusting mechanism, an oxygen-containing gas adjusting mechanism, and a coolant adjusting mechanism are connected respectively to the fuel gas connection passage, the oxygen-containing gas connection passage, and the coolant connection passage. These adjusting mechanisms adjust the temperatures in the cell assemblies, the relative humidity in the fuel gas, and the relative humidity in the oxygen-containing gas.

5 Claims, 8 Drawing Sheets

FUEL CELL WITH FUEL GAS ADJUSTMENT MECHANISM

BACKGROUND OF THE INVENTION

1. Field of the Invention

The present invention relates to a fuel cell which is capable of controlling the flow rates of reactant gases and a coolant, and a method of controlling such a fuel cell.

2. Description of the Related Art

Generally, solid polymer electrolyte fuel cells include an electrolyte membrane comprising a polymer ion exchange membrane. Specifically, the solid polymer electrolyte fuel, cell has a unit cell (electric power generating unit cell) comprising a membrane electrode assembly (MEA) including an anode, a cathode, and an electrolyte membrane interposed between the anode and the cathode. Each of the anode and the cathode comprises a base primarily made of carbon and an electrode catalyst layer of a precious metal joined to the base. The membrane electrode assembly is interposed between separators (bipolar plates) each including a coolant passage. Typically, the solid polymer electrolyte fuel cell employs a plurality of such unit cells that are stacked into a cell assembly.

In the cell assembly, a fuel gas such as a hydrogen-containing gas is supplied to the anode. The catalyst of the anode induces a chemical reaction of the fuel gas to split the hydrogen molecule into hydrogen ions (protons) and electrons. The hydrogen ions move toward the cathode through the electrolyte membrane, and the electrons flow through an external circuit to the cathode, creating a DC electric current. An oxygen-containing gas or air is supplied to the cathode. At the cathode, the hydrogen ions from the anode combine with the electrons and oxygen to produce water.

For use on vehicles, the cell assembly is required to be able to produce a relatively large output level and also to be small. To meet this requirement, there has been proposed a structure comprising a plurality of relatively compact unit cells that are stacked together.

While in operation, the cell assembly is subject to different conditions such as under a low load at a low temperature, under a high load at a high temperature, etc. A unit cell in the cell assembly which serves as an inlet for reactant gases (a fuel gas and an oxygen-containing gas) and another unit cell in the cell assembly which serves as an outlet for reactant gases occasionally fail to be optimized to such different operating conditions of the cell assembly. Specifically, a temperature distribution is likely to be developed along the stack of unit cells, and the relative humidities in the fuel gas and the oxygen-containing gas tend to vary. If the electrolyte membrane is dried due to a temperature rise caused by such a temperature distribution and variations of the relative humidities, then hydrogen ions in the electrolyte membrane are impeded against movement and hence provides a resistance, lowering the ability of the cell assembly to generate electric power. If the relative humidity in the oxygen-containing gas rises, then the cathode generates excessive water due to the relative humidity and water generated in the electrochemical reaction, causing water condensation and water clogging in the gas passage which obstructs the flow of the oxygen-containing gas. As a result, the cathode becomes less reactive, also lowering the ability of the cell assembly to generate electric power.

SUMMARY OF THE INVENTION

It is a major object of the present invention to provide a fuel cell which is capable of controlling a flow of reactant gases and a flow of a coolant thereby to optimize the operation of a cell assembly depending on conditions including a load, a temperature, etc., and a method of controlling such a fuel cell.

A fuel cell according to the present invention has cell assemblies each comprising a plurality of unit cells. The cell assemblies have reactant gas passages and coolant passages defined at least partly therein and connected in series with each other between the unit cells. A fuel gas outlet/inlet passage for passing a fuel gas therethrough extends between the unit cells and connects with fuel gas passages of the reactant gas passages, and a fuel gas adjusting mechanism is connected to the fuel gas outlet/inlet passage. The fuel gas adjusting mechanism controls the flow rate and direction of the fuel gas between the unit cells to suppress variations in the temperature and relative humidity of the fuel gas in each of the unit cells. The reactant gas passages are thus prevented from developing water condensation and water clogging due to drying of or excessive water in electrolyte membranes in the unit cells. As a result, an electrochemical reaction in each unit cell is stabilized and accelerated for an increased electric power generating capability of the fuel cell.

The fuel cell also has an oxygen-containing gas outlet/inlet passage for passing an oxygen-containing gas therethrough extends between the unit cells and connects with oxygen-containing gas passages of the reactant gas passages, and an oxygen-containing gas adjusting mechanism is connected to the oxygen-containing gas outlet/inlet passage. The oxygen-containing gas adjusting mechanism controls the flow rate and direction of the oxygen-containing gas. Since controlling the flow rate and direction of the oxygen-containing gas is also effective to suppress variations in the temperature and relative humidity of the oxygen-containing gas in each of the unit cells, the reactant gas passages are thus prevented from developing water condensation and water clogging due to drying of or excessive water in electrolyte membranes. As a result, an electrochemical reaction in each unit cell is stabilized and accelerated for an increased electric power generating capability of the fuel cell.

The fuel cell further includes a coolant outlet/inlet passage extending between the unit cells and connecting with the coolant passages. A coolant adjusting mechanism is connected to the coolant outlet/inlet passage for controlling the flow rate and direction of the coolant to uniformize the temperature in the direction of the stack of the unit cells for thereby preventing the reactant gas passages from developing water condensation and water clogging due to drying of or excessive water in electrolyte membranes. As a result, an electrochemical reaction in each unit cell is stabilized and accelerated for an increased electric power generating capability of the fuel cell.

In the fuel cell, at least two of the unit cells of the cell assemblies are juxtaposed. Because at least some of the unit cells are juxtaposed, any adverse effects which the temperatures and relative humidities of the cell assemblies have on each other are much smaller than if the unit cells are stacked together. Therefore, the electrochemical reactions in the unit cells are more stabilized and accelerated for further increasing the electric power generating capability of the fuel cell.

According to the present invention, there is provided a method of controlling a fuel cell having cell assemblies each comprising a plurality of unit cells, the cell assemblies having reactant gas passages and coolant passages defined at least partly therein and connected in series with each other between the unit cells. A fuel gas flowing through fuel gas passages of the reactant gas passages is adjusted by a fuel gas adjusting mechanism for thereby adjusting the temperature and relative humidity of the fuel gas in each of the unit cells. The reactant gas passages are thus prevented from developing water condensation and water clogging due to drying of or excessive water in electrolyte membranes in the unit cells. As a result, an electrochemical reaction in each unit cell is stabilized and accelerated for an increased electric power generating capability of the fuel cell.

In the method, an oxygen-containing gas flowing through oxygen-containing gas passages of the reactant gas passages is adjusted by an oxygen-containing gas adjusting mechanism for thereby adjusting the temperature and relative humidity of the cell assemblies. Controlling the oxygen-containing gas is also effective to adjust the temperature and relative humidity of the oxygen-containing gas in the unit cells for thereby preventing the reactant gas passages from developing water condensation and water clogging due to drying of or excessive water in electrolyte membranes in the unit cells. As a result, an electrochemical reaction in each unit cell is stabilized and accelerated for an increased electric power generating capability of the fuel cell.

In the method, a coolant supplied to and/or discharged from a coolant outlet/inlet passage extending between the unit cells and connecting with the coolant passages is adjusted by a coolant adjusting mechanism for thereby adjusting the temperatures and relative humidities of the cell assemblies. Therefore, the temperatures in the stacked direction in the unit cells are controlled to prevent the reactant gas passages from developing water condensation and water clogging due to drying of and excessive water in the electrolyte membranes. As a consequence, an electrochemical reaction in each unit cell is stabilized and accelerated for an increased electric power generating capability of the fuel cell.

In the method, the reactant gases and the coolant are controlled to operate unit cells into which the coolant is initially introduced at the time of a startup of the cell assemblies. With the fuel cell installed on a vehicle or the like, therefore, the fuel cell can quickly be warmed up, and the vehicle is prevented from stalling due to a voltage drop in the cell assembly at a relatively high temperature when the vehicle runs immediately after the startup.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
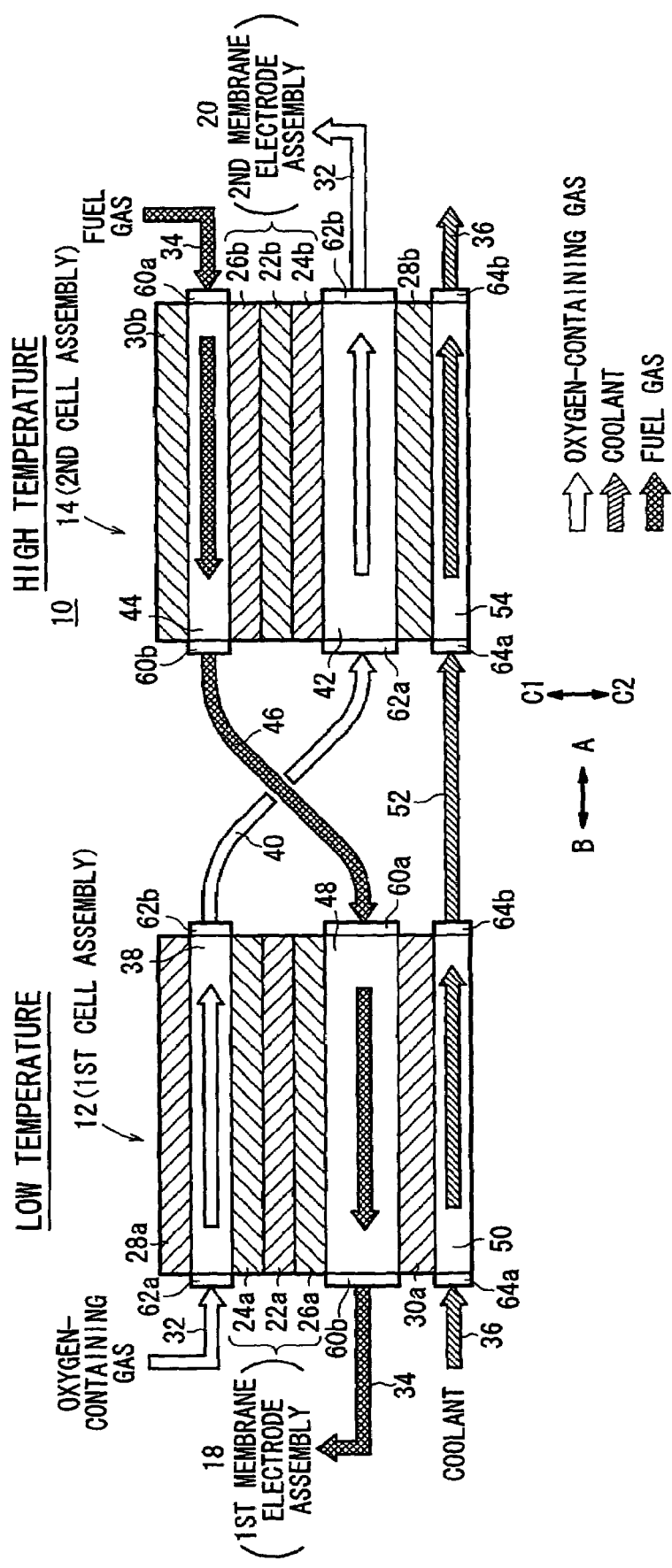
FIG. 1 is a schematic cross-sectional view of a fuel cell according to an embodiment of the present invention.

FIG. 1 shows in schematic cross section a fuel cell 10 according to an embodiment of the present invention.

As shown in FIG. 1, the fuel cell 10 comprises a first cell assembly 12 and a second cell assembly 14. The first cell assembly 12 serves as an upstream cell assembly with respect to the direction indicated by the arrow A in which an oxygen-containing gas (a reactant gas) and a coolant flow, and the second cell assembly 14 serves as a downstream cell assembly with respect to the direction in which the oxygen-containing gas and the coolant flow.

The first cell assembly 12 and the second cell assembly 14 have respective first and second membrane electrode assemblies 18, 20. The first and second membrane electrode assemblies 18, 20 have respective solid polymer electrolyte membranes 22a, 22b, and respective cathodes 24a, 24b and respective anodes 26a, 26b sandwiching the solid polymer electrolyte membranes 22a, 22b. The solid polymer electrolyte membrane 22a comprises a low-temperature electrolyte membrane (e.g., an HG (hydrocarbon) membrane), and the solid polymer electrolyte membrane 22b comprises a high-temperature electrolyte membrane (e.g., a perfluorosulfonic acid membrane). The solid polymer electrolyte membrane 22a has an electric power generating capability equivalent to the electric power generating capability of the solid polymer electrolyte membrane 22b at a temperature lower than the solid polymer electrolyte membrane 22b.

Each of the cathodes 24a, 24b and the anodes 26a, 26b comprises a base primarily made of carbon and an electrode catalyst layer of a precious metal joined to the base. Each of the cathodes 24a, 24b and the anodes 26a, 26b has on its surface a gas diffusion layer comprising a porous carbon paper or the like which serves as a porous layer.

In the first membrane electrode assembly 18, the cathode 24a faces upwardly in the direction indicated by the arrow C1, and the anode 26a faces downwardly in the direction indicated by the arrow C2. In the second membrane electrode assembly 20, the anode 26b faces upwardly in the direction indicated by the arrow C1, and the cathode 24b faces downwardly in the direction indicated by the arrow C2.

First separators 28a, 28b are disposed respectively on the cathodes 24a, 24b of the first and second membrane electrode assemblies 18, 20. Second separators 30a, 30b are disposed respectively on the anodes 26a, 26b of the first and second membrane electrode assemblies 18, 20.

The first cell assembly 12 has a first oxygen-containing gas passage 38 defined between the first separator 28a and the cathode 24a of the first membrane electrode assembly 18 and extending in the direction indicated by the arrow A. The first oxygen-containing gas passage 38 connects with an oxygen-containing gas connection passage (oxygen-containing gas outlet/inlet passage) 40, and also connects with a second oxygen-containing gas passage 42 that is defined between the cathode 24b and the first separator 28b of the second membrane electrode assembly 20 of the second cell assembly 14.

The first oxygen-containing gas passage 38, the oxygen-containing gas connection passage 40, and the second oxygen-containing gas passage 42 are connected in series through the first cell assembly 12 and the second cell assembly 14 via an oxygen-containing gas discharge port 62b and an oxygen-containing gas supply port 62a. The oxygen-containing gas connection passage 40 is connected to an oxygen-containing gas adjusting mechanism (reactant gas adjusting mechanism) 78 (see FIG. 3), to be described later on, for controlling the temperature, relative humidity, and flow rate of the oxygen-containing gas.

The oxygen-containing gas adjusting mechanism 78 is connected to the first cell assembly 12 and the second cell assembly 14 by an oxygen-containing gas circulation passage 32 via the oxygen-containing gas supply port 62a and the oxygen-containing gas discharge port 62b.

The second cell assembly 14 has a first fuel gas passage 44 defined between the anode 26b and the second separator 30b of the second membrane electrode assembly 20 and extending in the direction indicated by the arrow B. The first fuel gas passage 44 connects with a fuel gas connection passage (fuel gas outlet/inlet passage) 46, and also connects with a second fuel gas passage 48 that is defined between the anode 26a and the second separator 30a of the first membrane electrode assembly 18 of the first cell assembly 12.

The first and second fuel gas passages 44, 48 and the first and second oxygen-containing gas passages 38, 42 provide respective counterflows along the opposite surfaces of the first and second membrane electrode assemblies 18, 20. The first fuel gas passage 44, the fuel gas connection passage 46, and the second fuel gas passage 48 are connected in series through the first cell assembly 12 and the second cell assembly 14 via a fuel gas discharge port 60b and a fuel gas supply port 60a. The fuel gas connection passage 46 is connected to a fuel gas adjusting mechanism (reactant gas adjusting mechanism) 76 (see FIG. 2), to be described later on, for controlling the temperature, relative humidity, and flow rate of a fuel gas (a reactant gas).

The fuel gas adjusting mechanism 76 is connected to the first cell assembly 12 and the second cell assembly 14 by a fuel gas circulation passage 34 via the fuel gas supply port 60a and the fuel gas discharge port 60b.

The second separator 30a of the first cell assembly 12 has a first coolant passage 50 in counterflow relation to the second fuel gas passage 48. The first coolant passage 50 connects with a coolant connection passage (coolant outlet/inlet passage) 52, and also connects with a second coolant passage 54 in parallel-flow relation to the second oxygen-containing gas passage 42 of the first separator 28b.

The first coolant passage 50, the coolant connection passage 52, and the second coolant passage 54 are connected in series through the first cell assembly 12 and the second cell assembly 14 via a coolant discharge port 64b and a coolant supply port 64a. The coolant connection passage 52 is connected to a coolant adjusting mechanism 80 (see FIG. 8), to be described later on, for controlling the temperature and flow rate of the coolant. The coolant adjusting mechanism 80 is connected to the first cell assembly 12 and the second cell assembly 14 by a coolant gas circulation passage 36 via the coolant gas supply port 64a and the coolant discharge port 64b.

In the present embodiment, the first cell assembly 12 and the second cell assembly 14 are described as incorporating the first membrane electrode assembly 18 and the second membrane electrode assembly 20, respectively. Actually, however, depending on an output voltage that is required to be produced by the fuel cell 10, the first and second membrane electrode assemblies 18, 20 make up a unit cell including the passages 38, 48, 50, and 42, 44, 54 and the separators 28a, 30a, and 28b, 30b, and a plurality of such unit cells are stacked into the cell assemblies 12, 14 used as the fuel cell 10.

In the present embodiment, the first cell assembly 12 and the second cell assembly 14 are shown as being juxtaposed substantially in the horizontal direction. However, the first cell assembly 12 and the second cell assembly 14 are not limited to such an arrangement, but may be stacked together in the vertical direction.

The circulation passages 32, 34, 36 and the connection passages 40, 46, 52 are provided by a piping mechanism including general pipes or tubes. The fuel cell 10 may not have a piping mechanism, but may comprise the first cell assembly 12 and the second cell assembly 14 which are joined to each other with passages defined therein as an alternative to a piping mechanism.

The fuel gas adjusting mechanism 76, the oxygen-containing gas adjusting mechanism 78, and the coolant adjusting mechanism 80 of the fuel cell 10 according to the present embodiment will be described below.

Figure 2:
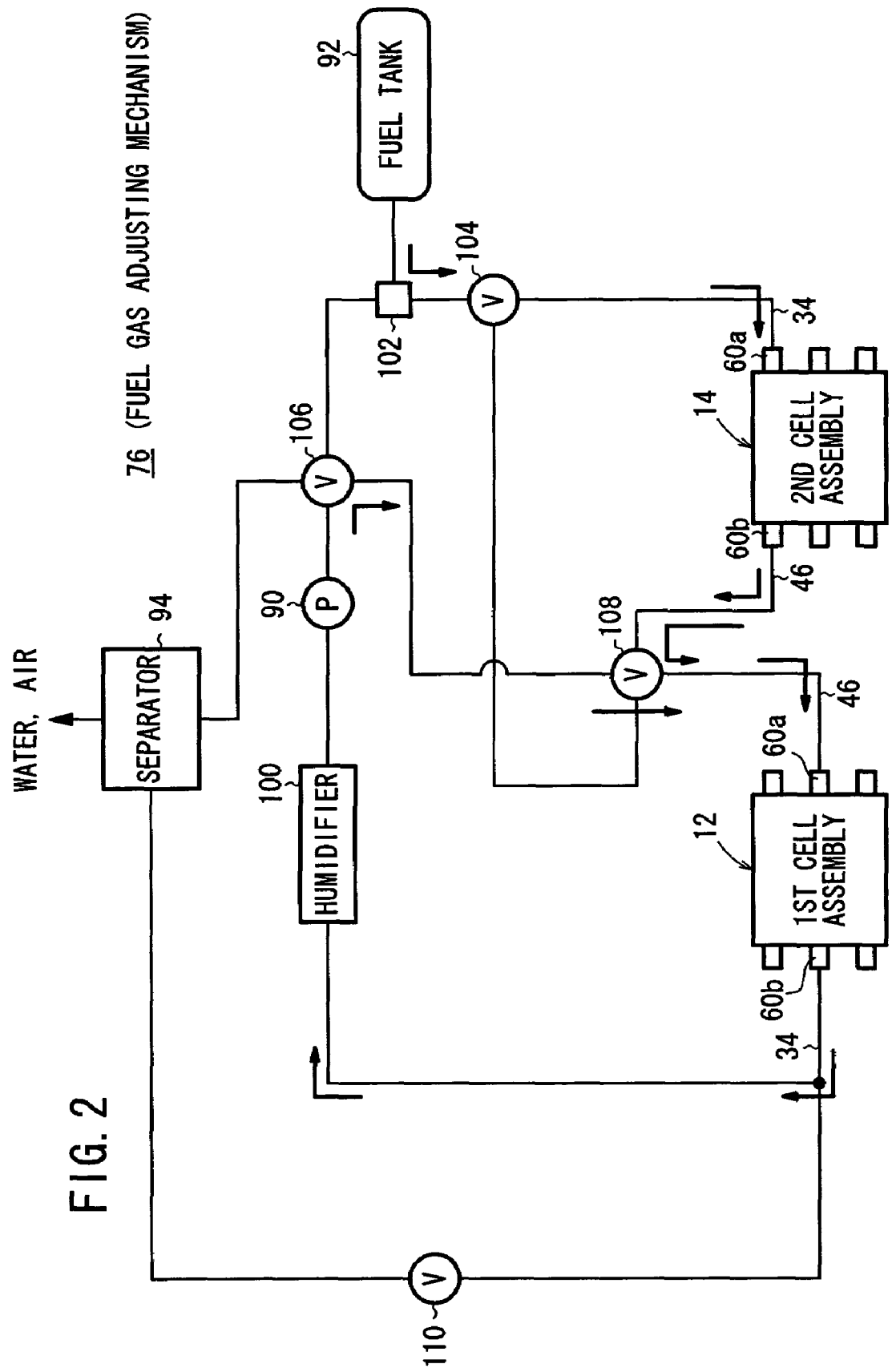
FIG. 2 is a schematic diagram of a fluid circuit of a fuel gas adjusting mechanism of the fuel cell which is set up to operate the fuel cell under medium and high loads.

As shown in FIG. 2, the fuel gas adjusting mechanism 76 comprises a fuel gas circulation passage 34 connected to the fuel gas discharge port 60b of the first cell assembly 12 and the fuel gas supply port 60a of the second cell assembly 14, a fuel gas pump 90 for circulating the fuel gas through the fuel gas circulation passage 34, a fuel tank 92 for storing the fuel gas which may be a hydrogen-containing gas or the like, a separator 94 for separating hydrogen, water, and air containing oxygen in the fuel gas, and a first humidifier 100 for humidifying the fuel gas.

The fuel gas adjusting mechanism 76 also has an ejector pump 102 for supplying the fuel gas from the fuel tank 92 under a negative pressure depending on the flow rate of the fuel gas flowing through the fuel gas circulation passage 34, directional control valves 104, 106, 108 such as solenoid-operated valves or the like for selecting passageways in the fuel gas circulation passage 34, and a purge valve 110 for discharging water and air contained in the fuel gas out of the fuel gas adjusting mechanism 76. The fuel gas adjusting mechanism 76 further includes a flowmeter, detecting mechanisms for detecting a temperature, a humidity, and a pressure, and a regulator for adjusting the pressure of a fuel gas flow, all not shown. The ejector pump 102 may be replaced with a regulator and a bypass passage thereof, for example, if the fuel gas is sufficiently circulated by the fuel gas pump 90.

Figure 3:
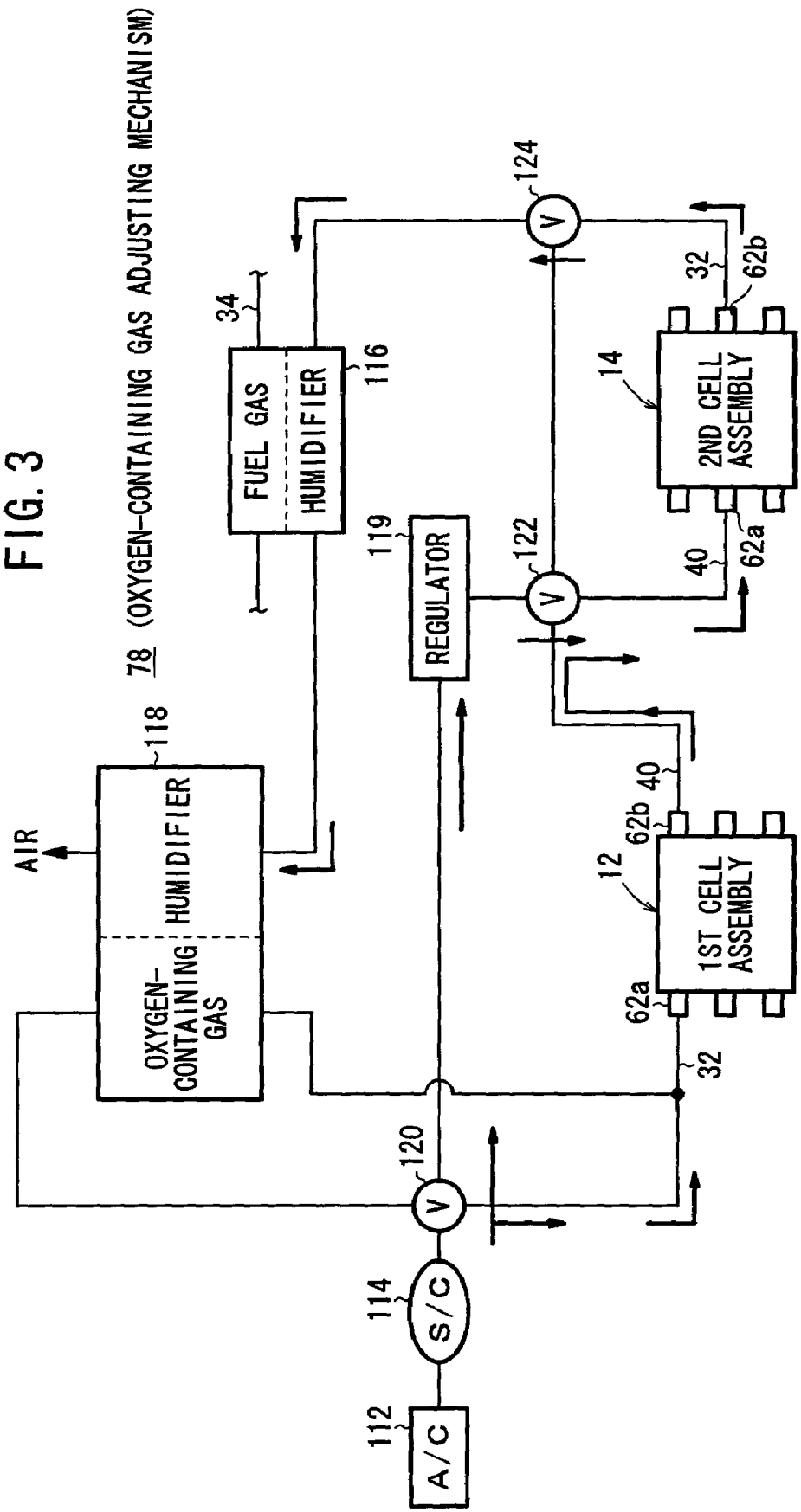
FIG. 3 is a schematic diagram of a fluid circuit of an oxygen-containing gas adjusting mechanism of the fuel cell which is set up to operate the fuel cell under medium and high loads.

As shown in FIG. 3, the oxygen-containing gas adjusting mechanism 78 comprises an oxygen-containing gas circulation passage 32 connected to the oxygen-containing gas supply port 62a of the first cell assembly 12 and the oxygen-containing gas discharge port 62b of the second cell assembly 14, an air compressor (A/C) 112 for generating compressed air, and a supercharger (S/C) 114 to which a motor (not shown) is coupled.

The oxygen-containing gas adjusting mechanism 78 also has a second humidifier 116 (which may also used as the first humidifier 100 shown in FIG. 2) for humidifying the fuel gas with the water that has been absorbed from the oxygen-containing gas through a membrane or the like, a third humidifier 118 for humidifying the oxygen-containing gas in an upstream region with the water that has been absorbed from the oxygen-containing gas through a membrane or the like, a regulator 119 for adjusting the pressure of an oxygen-containing gas flow, and directional control valves 120, 122, 124 such as solenoid-operated valves or the like for selecting passageways in the oxygen-containing gas circulation passage 32. The oxygen-containing gas circulation passage 32 further includes a flowmeter, detecting mechanisms for detecting a temperature, a humidity, and a pressure, etc., all not shown.

Figure 8:
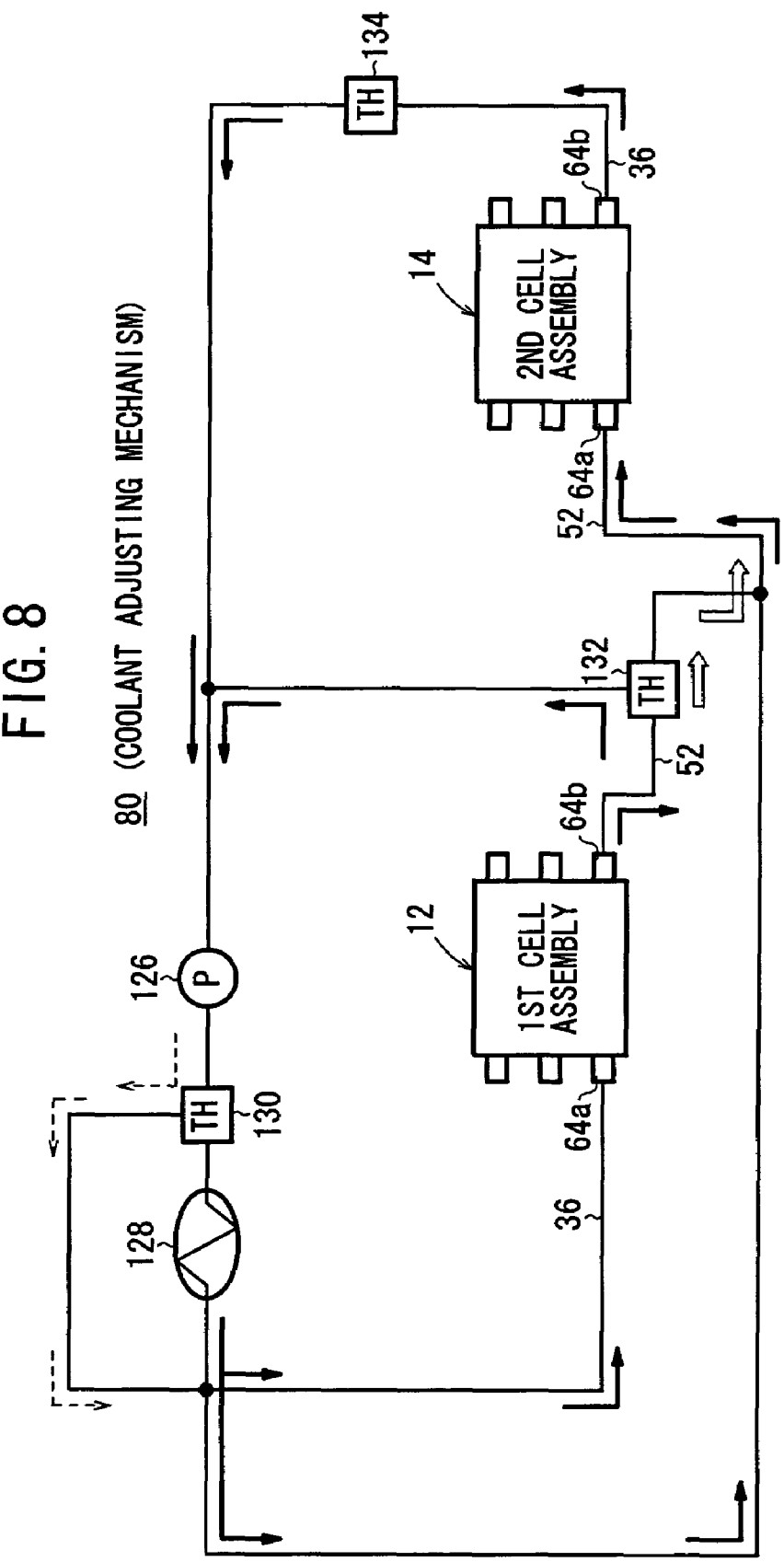
FIG. 8 is a schematic diagram of a fluid circuit of a coolant adjusting mechanism of the fuel cell.

As shown in FIG. 8, the coolant adjusting mechanism 80 comprises a looped coolant circulation passage 36 connected to the coolant supply port 64a of the first cell assembly 12 and the coolant discharge port 64b of the second cell assembly 14, a pump 126 for circulating the coolant through the coolant circulation passage 36, a radiator 128 connected to the outlet of the pump 126, and thermovalves 130, 132, 134 each having a directional control function or a flow rate adjusting function and a temperature detecting function. The coolant circulation passage 36 further includes a flowmeter, detecting mechanisms for detecting a temperature, a humidity, and a pressure, etc., all not shown.

The fuel cell 10 is combined with a controller (not shown) for controlling the fuel cell 10 including the fuel gas adjusting mechanism 76, the oxygen-containing gas adjusting mechanism 78, and the coolant adjusting mechanism 80.

The fuel cell 10 according to the present embodiment is basically constructed as described above. Operation and advantages of the fuel cell 10 will be described below with respect to a process of controlling reactant gas flows and a process of controlling a coolant temperature.

General operation of the fuel cell 10 will first be described below with reference to FIG. 1.

The first cell assembly 12 is supplied with the oxygen-containing gas or air from an end of the oxygen-containing gas circulation passage 32 via the oxygen-containing gas supply port 62a, and the second cell assembly 14 is supplied with the fuel gas, which may be a hydrogen-containing gas or the like, from an end of the fuel gas circulation passage 34 via the fuel gas supply port 60a. The first cell assembly 12 is also supplied with the coolant, which may be ethylene glycol or oil, from an end of the coolant circulation passage 36 via the coolant supply port 64a.

The oxygen-containing gas introduced into the first cell assembly 12 has its oxygen consumed to generate electric power by way of an electrochemical reaction with the fuel gas. The oxygen-containing gas whose oxygen has partly been consumed in the first cell assembly 12 is discharged from the oxygen-containing gas discharge port 62b, and then supplied through the oxygen-containing gas connection passage 40 to the oxygen-containing gas supply port 62a of the second cell assembly 14. The oxygen-containing gas introduced into the second cell assembly 14 has its oxygen consumed to generate electric power by way of an electrochemical reaction with the fuel gas, and thereafter is discharged from the oxygen-containing gas discharge port 62b into another end of the oxygen-containing gas circulation passage 32.

The fuel gas introduced into the second cell assembly 14 has its fuel (hydrogen) consumed to generate electric power by way of the electrochemical reaction with the oxygen-containing gas. The fuel gas whose fuel (hydrogen) has partly been consumed in the second cell assembly 14 is discharged from the fuel gas discharge port 60b, and thereafter is supplied through the fuel gas connection passage 46 to the fuel gas supply port 60a of the first cell assembly 12. The fuel gas introduced into the first cell assembly 12 has its fuel (hydrogen) consumed to generate electric power by way of the electrochemical reaction with the oxygen-containing gas, and thereafter is discharged from the fuel gas discharge port 60b into another end of the fuel gas circulation passage 34.

The coolant introduced into the first cell assembly 12 is consumed to cool the first cell assembly 12, and thereafter is discharged from the coolant discharge port 64b. The coolant that has been discharged from the coolant discharge port 64b is supplied through coolant connection passage 52 to the coolant supply port 64a of the second cell assembly 14. The coolant that has been supplied to the second cell assembly 14 is consumed to cool the second cell assembly 14, and thereafter is discharged from the coolant discharge port 64b into another end of the coolant gas circulation passage 36.

The electric power generated when the fuel gas and the oxygen-containing gas are supplied to the first cell assembly 12 and the second cell assembly 14 is extracted via a current terminal (not shown) to an external circuit, which uses the electric power in the form of a direct current.

In the fuel cell 10 according to the present embodiment, as described above, the fuel gas is supplied from the second cell assembly 14 to the first cell assembly 12 and the oxygen-containing gas and the coolant are supplied from the first cell assembly 12 to the second cell assembly 14 as indicated by the arrows (see FIG. 1) along the connection passages 40, 46, 52 and the circulation passages 34, 32, 36. Since the coolant is supplied from the first cell assembly 12 to the second cell assembly 14, the first cell assembly 12 basically has a temperature lower than the second cell assembly 14.

The process of controlling reactant gas flows in the fuel cell 10 depending on load conditions thereof and the process of controlling the temperature of the fuel cell 10 by controlling the coolant flow will be described below. It is assumed that the fuel cell 10 is installed on a vehicle such as an automobile or the like.

First, operation of the fuel cell 10 under medium or high load conditions (the vehicle is either running at a constant speed or running uphill) will be described below.

The flow of the fuel gas is controlled as indicated by the arrows in FIG. 2. Specifically, the directional control valves 106, 104 are actuated and the fuel gas pump 90 is actuated to introduce the fuel gas supplied from the fuel tank 92 via the ejector pump 102 into the second cell assembly 14. At this time, the fuel gas is dry. Though the second cell assembly 14 has a relatively high temperature, it contains a sufficient amount of water necessary for an electrochemical reaction because of the water generated in the second cell assembly 14 by an electrochemical reaction and the water contained in the oxygen-containing gas that is discharged from the first cell assembly 12 and then introduced into the second cell assembly 14. Therefore, even though the supplied fuel gas is dry, the solid polymer electrolyte membrane 22b in the second cell assembly 14 is prevented from being dried. Since the second cell assembly 14 has a relatively high temperature, with an increased water vapor partial pressure developed therein, water condensation is prevented from occurring in the first fuel gas passage 44 in the second cell assembly 14.

The fuel gas which has been consumed by the electrochemical reaction in the second cell assembly 14 and discharged therefrom is introduced through the fuel gas connection passage 46 into the first cell assembly 12. The first cell assembly 12 has a relatively low temperature because it is supplied with the low-temperature coolant at first. If the amount of water contained in the fuel gas introduced into the first cell assembly 12 is not sufficient for the electrochemical reaction on the solid polymer electrolyte membrane 22a in the first cell assembly 12, then the directional control valve 108 is actuated to introduce a fuel gas which has been adjusted to a predetermined relative humidity by the first humidifier 100 into the fuel gas connection passage 46. The fuel gas introduced into the first cell assembly 12 is consumed by the electrochemical reaction, then discharged from the first cell assembly 12, and circulated through the first humidifier 100 and the fuel gas pump 90 to the directional control valve 108.

The flow of the oxygen-containing gas is controlled as indicated by the arrows in FIG. 3. Specifically, the directional control valves 120, 122, 124 are actuated to introduce the oxygen-containing gas supplied from the air compressor 112 via the supercharger 114 into the first cell assembly 12, while in a dry state, not through the third humidifier 118. At this time, the first cell assembly 12 has a relatively low temperature by the coolant supplied thereto, and hence contains a sufficient amount of water necessary for an electrochemical reaction because of the water generated in the first cell assembly 12 by an electrochemical reaction and the water contained in the fuel gas that is discharged from the second cell assembly 14 and then introduced into the first cell assembly 12. Though the first oxygen-containing gas passage 38 in the first cell assembly 12 tends to condense water therein because the first cell assembly 12 has a relatively low temperature, the dry oxygen-containing gas prevents water condensation in the first oxygen-containing gas passage 38.

The oxygen-containing gas consumed by the electrochemical reaction in the first cell assembly 12 and discharged therefrom is introduced through the oxygen-containing gas connection passage 40 into the second cell assembly 14. At this time, the second cell assembly 14 has a relatively high temperature. If the amount of the oxygen-containing gas introduced into the second cell assembly 14 is not sufficient for the electrochemical reaction on the solid polymer electrolyte membrane 22b in the second cell assembly 14, then the directional control valves 120, 122 are actuated to introduce an oxygen-containing gas which has been adjusted to a predetermined pressure, i.e., a predetermined flow rate, by the regulator 119 into the oxygen-containing gas connection passage 40. The oxygen-containing gas introduced into the second cell assembly 14 is consumed by the electrochemical reaction, and then discharged from the second cell assembly 14. The oxygen-containing gas discharged from the second cell assembly 14 imparts water to the fuel gas in the second humidifier 116, and then is discharged via the third humidifier 118 out of the oxygen-containing gas adjusting mechanism 78.

Operation of the fuel cell 10 under low load conditions (corresponding to an idling mode of a vehicle powered by an internal combustion engine) will be described below.

Figure 4:
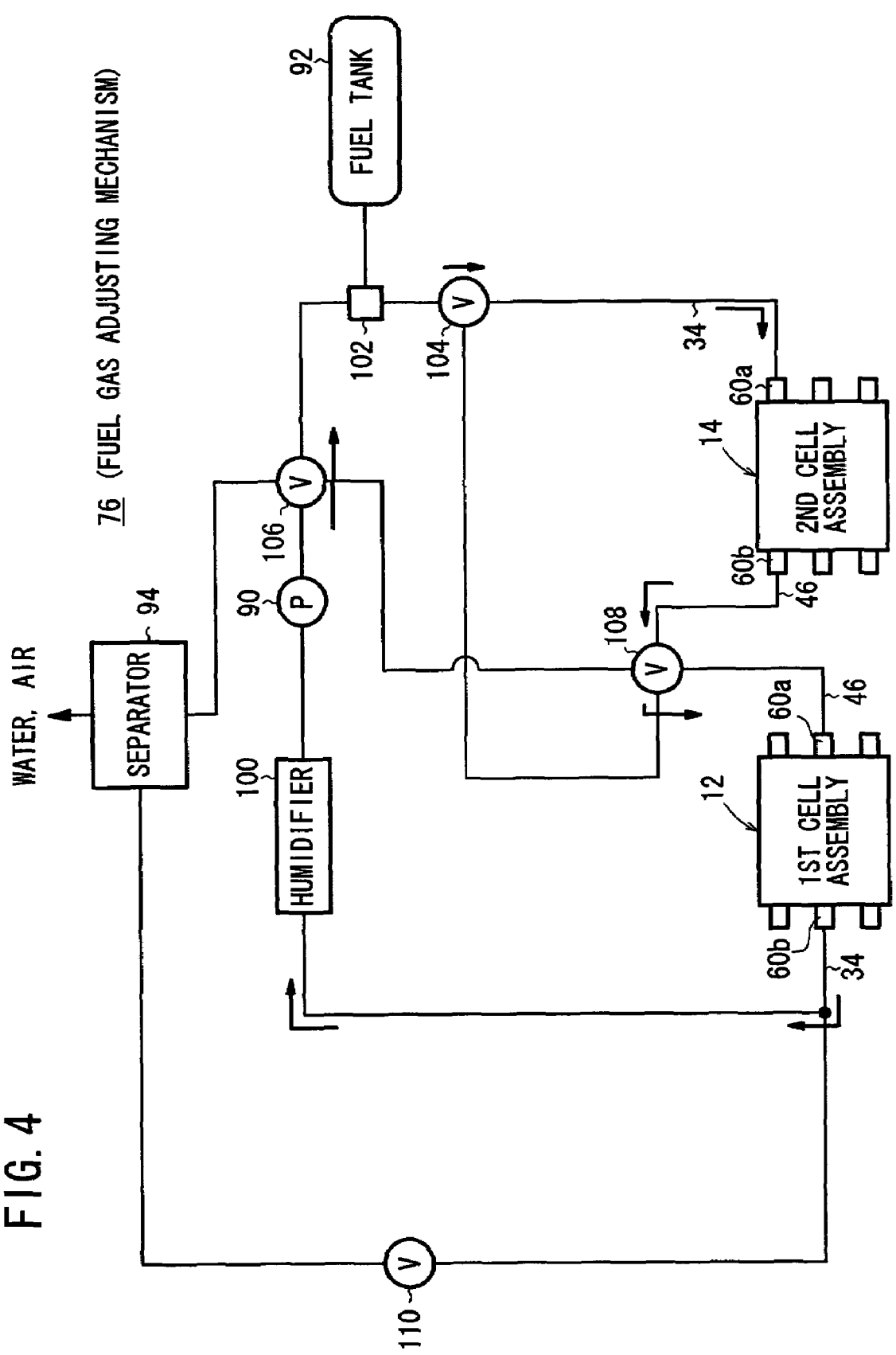
FIG. 4 is a schematic diagram of a fluid circuit of the fuel gas adjusting mechanism of the fuel cell which is set up to operate the fuel cell under a low load.

The flow of the fuel gas is controlled as indicated by the arrows in FIG. 4. Specifically, the directional control valves 106, 104 are actuated, the fuel gas pump 90 is actuated, and the injector pump 102 is operated to introduce the fuel gas supplied from the fuel tank 92 into the second cell assembly 14 after being mixed with a fuel gas humidified by the first humidifier 100 (a fuel gas circulated from the first cell assembly 12). The fuel gas is humidified because the water generated in the second cell assembly 14 by an electrochemical reaction and the water contained in the oxygen-containing gas that is discharged from the first cell assembly 12 and then introduced into the second cell assembly 14 are of a small amount. Therefore, a sufficient amount of water is maintained for an electrochemical reaction on the solid polymer electrolyte membrane 22b in the second cell assembly 14, preventing the solid polymer electrolyte membrane 22b from being dried.

The fuel gas which has been consumed by the electrochemical reaction in the second cell assembly 14 and discharged therefrom is introduced through the fuel gas connection passage 46 into the first cell assembly 12. Since the first cell assembly 12 has a relatively low temperature, the fuel gas introduced into the first cell assembly 12 contains an amount of water sufficient for the electrochemical reaction on the solid polymer electrolyte membrane 22a in the first cell assembly 12. Consequently, the fuel gas is not mixed with a humidified fuel gas by the directional control valve 108. The fuel gas introduced into the first cell assembly 12 is consumed by the electrochemical reaction, then discharged from the first cell assembly 12, circulated through the first humidifier 100 and the fuel gas pump 90, mixed with the fuel gas supplied from the fuel tank 92 by the ejector pump 102, and then circulated.

Figure 5:
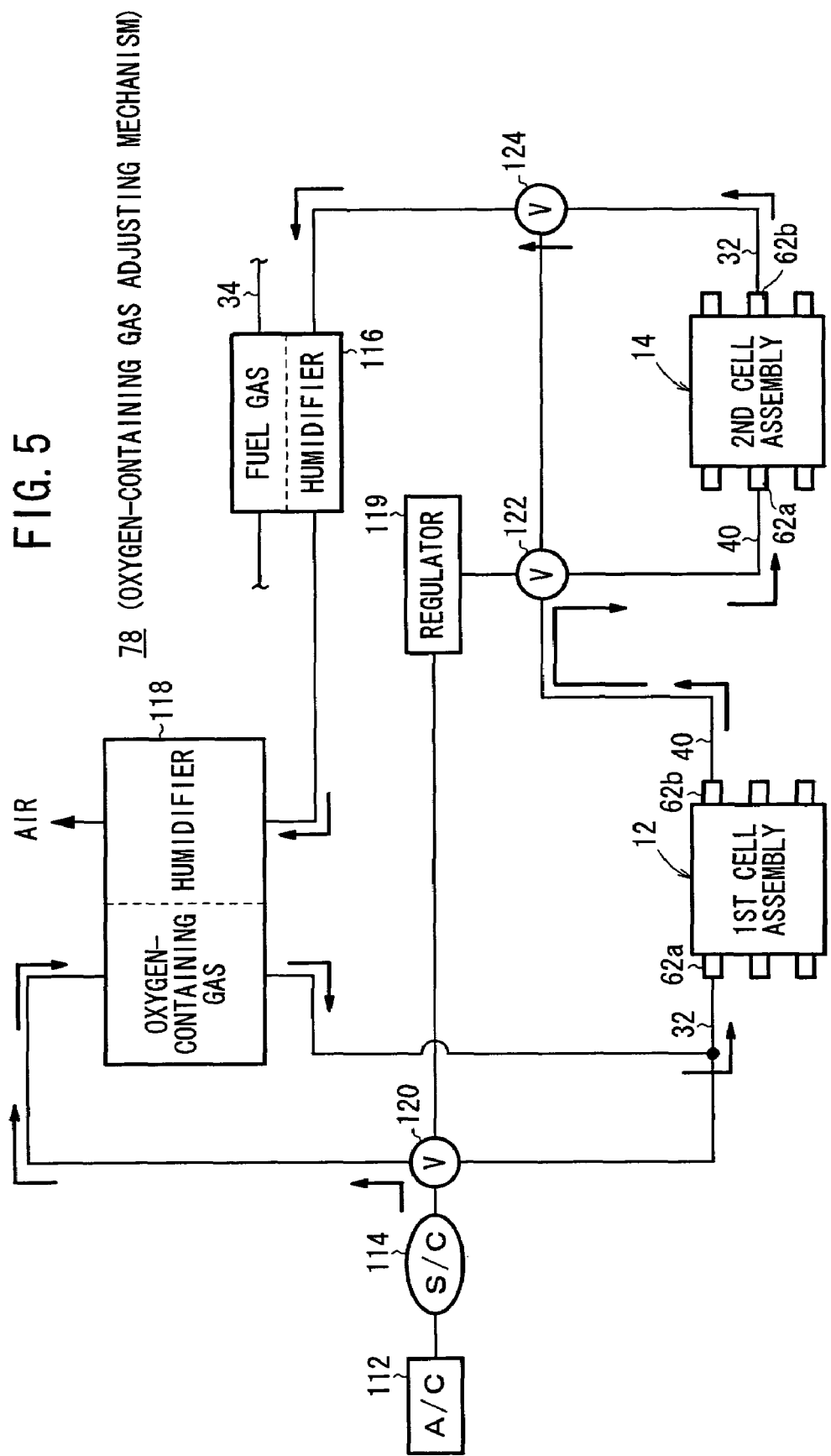
FIG. 5 is a schematic diagram of a fluid circuit of the oxygen-containing gas adjusting mechanism of the fuel cell which is set up to operate the fuel cell under a low load.

The flow of the oxygen-containing gas is controlled as indicated by the arrows in FIG. 5. Specifically, the directional control valves 120, 122, 124 are actuated to introduce the oxygen-containing gas supplied from the air compressor 112 via the supercharger 114 into the first cell assembly 12 after the oxygen-containing gas is humidified by the third humidifier 118. The oxygen-containing gas is humidified because the water generated in the first cell assembly 12 by an electrochemical reaction and the water contained in the fuel gas that is discharged from the second cell assembly 14 and then introduced into the first cell assembly 12 are of a small amount. Therefore, a sufficient amount of water is maintained for an electrochemical reaction on the solid polymer electrolyte membrane 22a in the first cell assembly 12, preventing the solid polymer electrolyte membrane 22a from being dried.

The oxygen-containing gas consumed by the electrochemical reaction in the first cell assembly 12 and discharged therefrom is introduced through the oxygen-containing gas connection passage 40 into the second cell assembly 14. At this time, the second cell assembly 14 has a relatively high temperature. Inasmuch as the amount of the oxygen-containing gas introduced into the second cell assembly 14 is sufficient for the electrochemical reaction on the solid polymer electrolyte membrane 22b in the second cell assembly 14, the oxygen-containing gas is not mixed with a humidified oxygen-containing gas by the directional control valve 122. The oxygen-containing gas introduced into the second cell assembly 14 is consumed by the electrochemical reaction, and then discharged from the second cell assembly 14. The oxygen-containing gas discharged from the second cell assembly 14 flows through the second humidifier 116 and then the third humidifier 118, which absorb water from the oxygen-containing gas. The oxygen-containing gas is then discharged out of the oxygen-containing gas adjusting mechanism 78.

Operation of the fuel cell 10 for warming-up operation at the time of a startup corresponding to a warming-up mode of a vehicle powered by an internal combustion engine) will be described below.

Figure 6:
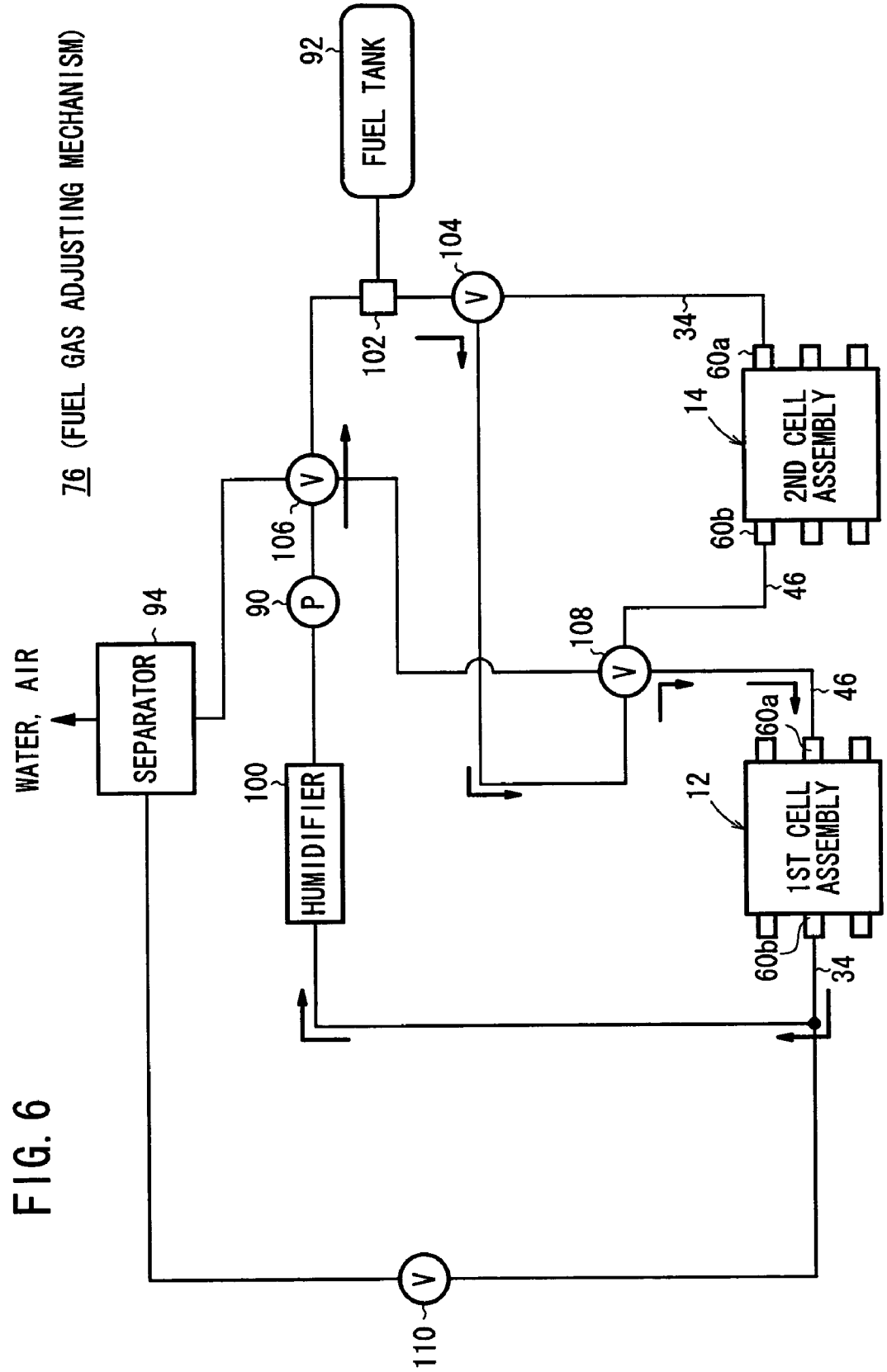
FIG. 6 is a schematic diagram of a fluid circuit of the fuel gas adjusting mechanism of the fuel cell which is set up for warming-up operation at the time of a startup.

The flow of the fuel gas is controlled as indicated by the arrows in FIG. 6. Specifically, the directional control valves 106, 104, 108 are actuated to introduce the fuel gas supplied from the fuel tank 92 by the fuel gas pump 90 into the first cell assembly 12. The fuel gas discharged from the first cell assembly 12 is adjusted to a predetermined relative humidity by the first humidifier 100, and then circulated in the direction indicated by the arrows in FIG. 6.

Figure 7:
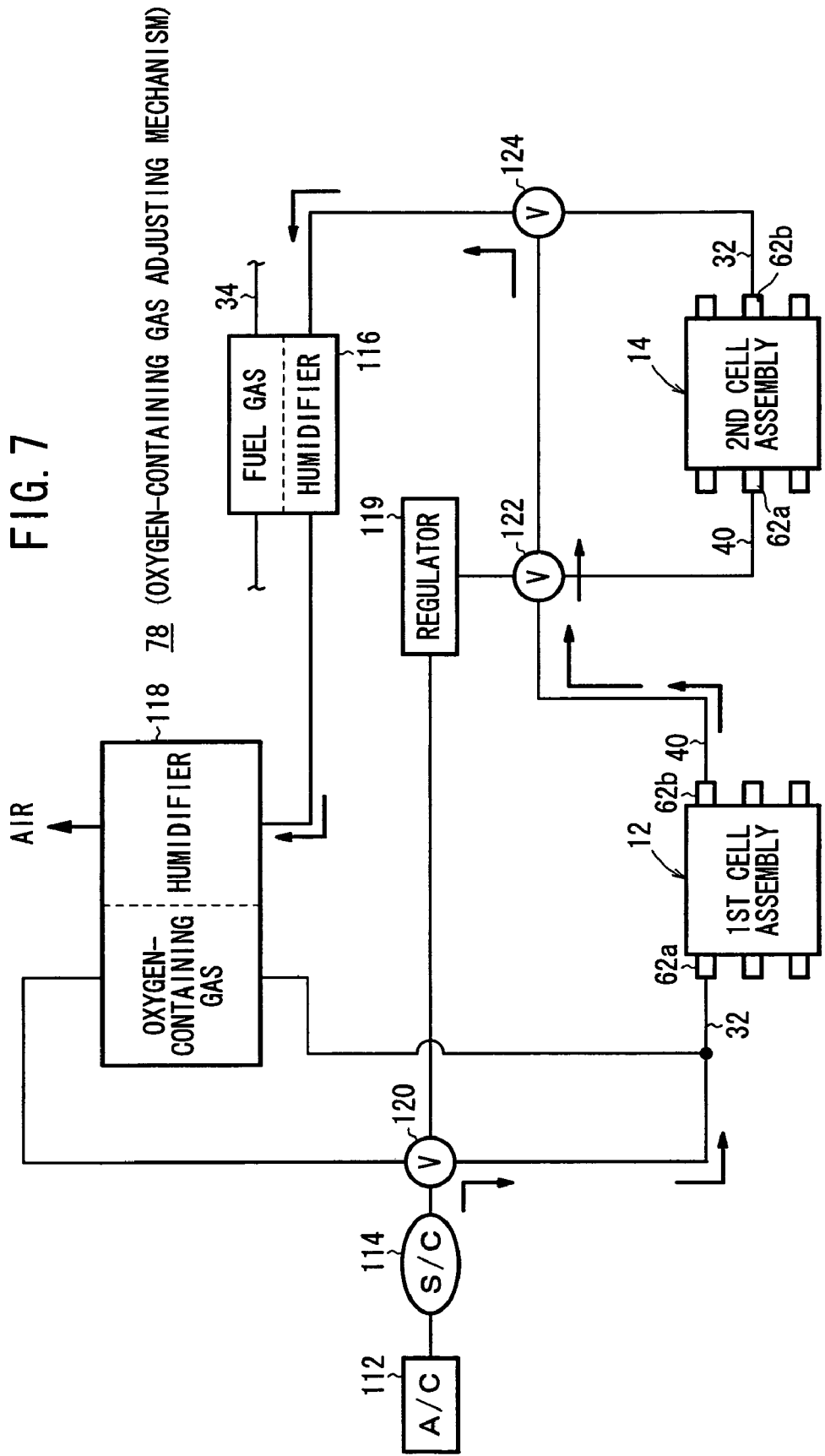
FIG. 7 is a schematic diagram of a fluid circuit of the oxygen-containing gas adjusting mechanism of the fuel cell which is set up for warming-up operation at the time of a startup.

The flow of the oxygen-containing gas is controlled as indicated by the arrows in FIG. 7. The directional control valve 120 is actuated to introduce the oxygen-containing gas supplied from the air compressor 112 via the supercharger 114 into the first cell assembly 12, while in a dry state, not through the third humidifier 118. The oxygen-containing gas discharged from the first cell assembly 12 is introduced by the directional control valves 122, 124 into the second humidifier 116, in which the oxygen-containing gas absorbs water from the fuel gas. The oxygen-containing gas is then discharged through the third humidifier 118 out of the oxygen-containing gas adjusting mechanism 78.

In the warming-up operation at the time of a startup, as described above, only the first cell assembly 12 at a relatively low temperature is operated. As a result, the fuel cell 10 is quickly warmed up, and the vehicle is prevented from stalling (an engine stop) due to a voltage drop in the second cell assembly 14 when the vehicle runs immediately after the startup.

The process of controlling the temperature of the fuel cell 10 by controlling the coolant flow will be described below.

When the vehicle is under medium or high load conditions, the flow of the coolant is controlled as indicated by the solid-line arrows in FIG. 8. Specifically, the coolant circulated by the pump 126 is controlled by the thermovalve 130 to flow into the radiator 128. The coolant is cooled by the radiator 128, and then introduced into the first cell assembly 12 and the second cell assembly 14. The coolant discharged from the first cell assembly 12 is circulated to the pump 126 by the thermovalve 132.

When the vehicle is under low load conditions, the coolant discharged from the first cell assembly 12 as described above when the vehicle is under medium or high load conditions is supplied by the thermovalve 132 to the second cell assembly 14, and combined with the coolant flowing from the radiator 128, as indicated by the blank arrows in FIG. 8. In warming-up operation at the time of a startup, the thermovalve 130 is actuated to guide the coolant, which is circulated by the pump 126 as described above when the vehicle is under medium or high load conditions, to bypass the radiator 128 as indicated by the broken-line arrows in FIG. 8.

In order to meet temperature situations in the first cell assembly 12 and the second cell assembly 14, the thermovalves 130, 132 are actuated by commands generated by the controller (not shown) based on the temperatures of the coolant which are detected by the thermovalves 130, 132, 134. In this manner, the temperatures of the first cell assembly 12 and the second cell assembly 14 can be controlled at optimum levels.

With the fuel cell 10 and its control method as described above, of the cell assemblies 12, 14 each comprising a plurality of stacked membrane electrode assemblies 18 or 20, one of the cell assemblies 12 is operated at a relatively low temperature, and the other cell assembly 14 at a relatively high temperature. The cell assemblies 12, 14 are interconnected by the oxygen-containing gas connection passage 40, the fuel gas connection passage 46, and the coolant connection passage 52 which connect with the first and second oxygen-containing gas passages 38, 42, the first and second fuel gas passages 44, 48, and the first and second coolant passages 50, 54. The fuel gas adjusting mechanism 76 is actuated to control the flow of the fuel gas in the fuel gas connection passage 46. The oxygen-containing gas adjusting mechanism 78 is actuated to control the flow of the oxygen-containing gas in the oxygen-containing gas connection passage 40. The coolant adjusting mechanism 80 is actuated to control the flow of the coolant in the coolant connection passage 52. The temperatures in the cell assemblies 12, 14, the relative humidity in the fuel gas, and the relative humidity in the oxygen-containing gas are also adjusted.

Therefore, since the temperatures in the stacked direction of the first and second membrane electrode assemblies 18, 20 in the cell assemblies 12, 14 are controlled, and also the relative humidity in the fuel gas and the relative humidity in the oxygen-containing gas are controlled. As a result, water condensation and water clogging are prevented from occurring in the first and second fuel gas passages 44, 48 and the first and second oxygen-containing gas passages 38, 42 due to drying of and excessive water in the solid polymer electrolyte membranes 22a, 22b. As a consequence, the electrochemical reactions in the cell assemblies 12, 14 are stabilized and accelerated for increasing the electric power generating capability of the fuel cell 10.

If the cell assemblies 12, 14 are juxtaposed substantially in the horizontal direction, then any adverse effects which the temperatures and relative humidities of the cell assemblies 12, 14 have on each other are much smaller than if the cell assemblies 12, 14 are stacked together. Therefore, the electrochemical reactions in the cell assemblies 12, 14 are more stabilized and accelerated for further increasing the electric power generating capability of the fuel cell 10.

Although a certain preferred embodiment of the present invention has been shown and described in detail, it should be understood that various changes and modifications may be made therein without departing from the scope of the appended claims.

What is claimed is:

1. A fuel cell, comprising:
a first stack having a plurality of unit cells;
a second stack having a plurality of unit cells, the second stack being separate from the first stack,
wherein each of said plurality of unit cells of the first and second stacks has a membrane electrode assembly including an anode, a cathode, and a solid polymer electrolyte membrane interposed between said anode and said cathode, wherein the first stack and the second stack have reactant gas passages and coolant passages defined at least partly therein and the reactant gas passages and the coolant passages are connected in series with each other across said plurality of unit cells for supplying or circulating one or more reactant gases and a coolant to said first and second stacks;
a fuel gas outlet/inlet passage connecting a fuel gas passage from the first stack with a fuel gas passage from the second stack for passing a fuel gas therethrough; and
a fuel gas adjusting mechanism connected to said fuel gas outlet/inlet passage for controlling the flow rate and direction of said fuel gas,
wherein the first stack and the second stack generate electric power simultaneously in use and are electrically connected in series.

2. A fuel cell according to claim 1, further comprising:
an oxygen-containing gas outlet/inlet passage connecting an oxygen-containing gas passage from the first stack with an oxygen-containing gas passage from the second stack for passing an oxygen-containing gas therethrough; and an oxygen-containing gas adjusting mechanism connected to said oxygen-containing gas outlet/inlet passage for controlling the flow rate and direction of said oxygen-containing gas.

3. A fuel cell according to claim 2, further comprising:

a coolant outlet/inlet passage connecting one of said coolant passages from the first stack to one of said coolant passages from the second stack, for passing a coolant therethrough; and a coolant adjusting mechanism connected to said coolant outlet/inlet passage for controlling the flow rate and direction of said coolant.

4. A fuel cell according to claim 1, further comprising:

a coolant outlet/inlet passage connecting one of said coolant passages from the first stack to one of said coolant passages from the second stack, for passing a coolant therethrough; and a coolant adjusting mechanism connected to said coolant outlet/inlet passage for controlling the flow rate and direction of said coolant.

5. A fuel cell according to claim 1, wherein at least two of said plurality of unit cells of said first and second stacks are juxtaposed.

\* \* \* \* \*

UNITED STATES PATENT AND TRADEMARK OFFICE
CERTIFICATE OF CORRECTION

| | |
|---|---|
| PATENT NO. | : 7,354,670 B2 |
| APPLICATION NO. | : 10/608452 |
| DATED | : April 8, 2008 |
| INVENTOR(S) | : Naoyuki Enjoji et al. |

It is certified that error appears in the above-identified patent and that said Letters Patent is hereby corrected as shown below:

Title Pg, Item (73) Assignee: replace "Kosyo" with --Kogyo--

Signed and Sealed this

Ninth Day of February, 2010

David J. Kappos
*Director of the United States Patent and Trademark Office*